(12) United States Patent
Hennessey et al.

(10) Patent No.: US 7,144,241 B2
(45) Date of Patent: Dec. 5, 2006

(54) METHOD AND APPARATUS FOR FORMING MICROSTRUCTURES ON POLYMERIC SUBSTRATES

(75) Inventors: Michael Hennessey, South Lyon, MI (US); David Strand, Bloomfield Township, Oakland County, MI (US); Barry Clark, Ortonville, MI (US); Paul Gasiorowski, Davisburg, MI (US)

(73) Assignee: Energy Conversion Devices, Inc., Rochester Hills, MI (US)

( * ) Notice: Subject to any disclaimer, the term of this patent is extended or adjusted under 35 U.S.C. 154(b) by 0 days.

(21) Appl. No.: 11/047,708

(22) Filed: Feb. 2, 2005

(65) Prior Publication Data

US 2005/0173071 A1    Aug. 11, 2005

Related U.S. Application Data

(62) Division of application No. 10/185,246, filed on Jun. 26, 2002.

(60) Provisional application No. 60/300,997, filed on Jun. 26, 2001.

(51) Int. Cl.
*B29C 59/04* (2006.01)
(52) U.S. Cl. ......... 425/363; 425/365; 425/810
(58) Field of Classification Search ........ 425/363, 425/373, 385, 810, 365, 364 R
See application file for complete search history.

(56) References Cited

U.S. PATENT DOCUMENTS

| | | | | |
|---|---|---|---|---|
| 2,849,752 A | * | 9/1958 | Leary | 425/385 |
| 3,072,519 A | * | 1/1963 | Salzman | 425/810 |
| 3,786,709 A | * | 1/1974 | Spengler | 83/339 |
| 3,874,836 A | * | 4/1975 | Johnson et al. | 425/363 |
| 4,543,225 A | * | 9/1985 | Beaujean | 425/363 |
| 4,599,125 A | * | 7/1986 | Buck | 156/248 |
| 5,320,514 A | * | 6/1994 | Kanome et al. | 425/363 |
| 5,527,497 A | * | 6/1996 | Kanome et al. | 425/810 |
| 6,024,907 A | * | 2/2000 | Jagunich | 425/385 |

* cited by examiner

*Primary Examiner*—James P. Mackey
(74) *Attorney, Agent, or Firm*—David W. Schumaker; Marvin S. Siskind

(57) ABSTRACT

Methods and apparatus for forming microstructures in the surface of polymeric web materials for use as optical memory substrates. The microstructures may be formed by laminating a hot stamper to a web of material with a selective time/temperature profile. The stamper may be heated to melt flow the surface of the web and stabilize before separation. The stamper may be carried by a support that is independent of the press. The web of polymeric material may be provided with a flow enhancer to improve image formation.

Also described herein are methods and apparatus for making optical memory modules, such as disks, which include novel stampers, coating applicators, and finishing systems.

3 Claims, 13 Drawing Sheets

METHOD AND APPARATUS FOR FORMING MICROSTRUCTURES ON POLYMERIC SUBSTRATES

CROSS-REFERENCE TO RELATED APPLICATIONS

This application is divisional of U.S. patent application Ser. No. 10/185,246 filed Jun. 26, 2002, which is, in turn, entitled to benefit of the earlier filing date and priority of, U.S. Provisional Patent Application No. 60/300,997, filed Jun. 26, 2001, the disclosure of which is herein incorporated by reference.

FIELD OF THE INVENTION

The present invention relates generally to methods and apparatus for making optical memory. More particularly, the present invention pertains to forming substrates for optical memory and for making optical disks using continuous feed or roll-to-roll systems.

BACKGROUND OF THE INVENTION

Optical memory disks, such as CD (compact disks), CD-R, CD-RW; DVD (digital versatile disks), DVD-R, DVD-ROM, DVD-RAM, DVD+RW, DVD-RW, PD (phase change disks) and MO (magneto optical), etc., are typically manufactured by initially forming a substrate and then depositing one or more thin film layers upon the substrate. Substrates for optical memory are usually formed with a series of grooves and/or pits arranged as concentric tracks or as a continuous spiral. The grooves and pits may be used for things such as laser beam tracking, address information, timing, error correction, data, etc. Substrates used for optical disks are typically formed by injection molding, where a molten polymeric material is injected into a disk shaped mold with one surface having the patterned microstructure to be replicated. The patterned microstructure is typically provided by an exchangeable insert, commonly referred to as a stamper. The injection molding process is comprised of a series of precisely timed steps, which include closing the mold, injecting the molten polymer, providing a controlled reduction in peak injection pressure, cooling, center-hole formation, opening the mold and removing the replicated disk and associated sprue. Following the molding process, disk substrates are typically coated with one or more thin film layers. Thereafter, substrates may be coated with various insulating and/or protective layers, bonding adhesive, decorative artwork, labels, etc.

Although injection-molding methods, such as those described above, can provide high quality optical memory disks with acceptable levels of birefringence and flatness, the rate of disk production is only in the neighborhood of several seconds. About 60% of this time is attributable to the molding step, and the rest is taken up by the need to open the mold, remove the disk and sprue, and then close the mold before the next cycle can begin. Furthermore, present attempts to improve production rate by using various novel de-molding techniques or by using multi-cavity molds have had only limited success.

Besides lower than desired production rates, injection molding requires complex closed-loop control over numerous parameters. For example, mold and polymer temperature, press clamp force, injection profile and hold time all have competing and often-opposed influences on birefringence, flatness, and on the accuracy of the replicated features. It should also be noted that molding difficulty increases as the thickness of the replicated disk decreases. So where standard CD substrates, which are approximately 1.2 mm thick, do not require the use of specialized techniques, such as increasing the molding cavity cross-section during the main injection phase, injection-compression molding, coining, "bump molding", etc., standard DVD substrates, which are approximately 0.6 mm thick, do in order to simultaneously meet birefringence and flatness specifications.

The trend in future optical memory products is toward thinner substrates and/or smaller disks. Directly manufacturing these products via injection molding may not be practical. For small diameter disks (i.e. 5–8 cm.), such as the ones used in Personal Digital Assistants (PDA's) and Digital Electronic Cameras, disturbances caused by center gating can influence the quality of the innermost tracks on the disk. These disturbances are associated with local turbulence, shear, and packing variation near the center gate in the mold and can produce locally poor flatness and high birefringence. As the minimum track diameter is reduced, these problems may be exemplified.

To speed-up the rate of manufacturing, a number of methods for manufacturing optical memory using continuous web processes have been proposed. These methods are built on the concept of forming a microstructure pattern on a continuous web of material by passing the web between a roller and a stamper.

To date, there have been two types of continuous web processes proposed. These processes include "in-line" and "off-line" methods. In-line continuous web processes integrate web extrusion with microstructure pattern formation in the same process, while off-line continuous web processes carry out web formation on pre-fabricated web material which is manufactured on another production line. The goal of in-line formation is to contact the web with a stamper immediately after web extrusion and while the web is still hot. Examples of in-line processes include those described in U.S. Pat. Nos. 5,137,661; 4,790,893; 5,433,897; 5,368,789; 5,281,371; 5,460,766; 5,147,592; and 5,075,060, the disclosures of which are herein incorporated by reference. The integration of web extrusion and web formation requires that a disk manufacturer not only engage in the business of producing optical disks but also in web extrusion. This makes the overall system a highly complex process, at a point in the process where it may not be desirable. Furthermore, because the disk manufacturer may not enjoy the same economies of scale that a plastic web manufacturer does, the cost per unit for disks formed with in-line processes may be higher than that for off-line processes. Thus, the present inventors propose that off-line processing not only offers the opportunity for improved throughput, reduced cost and complexity, and shorter start-up time, but for increased process flexibility as well.

One method of web formation, Which may be used for in-line processes for optical memory production, is proposed by Kime, U.S. Pat. No. 6,007,888, entitled "Directed Energy Assisted In Vacuo Micro Embossing" which issued Dec. 28, 1999, the disclosure of which is herein incorporated by reference. Kime discloses a continuous manufacturing process using directed energy assisted micro embossing. The patent describes a directed energy source used to heat web material and a stamper before they are pressed together by a pair of nip rollers.

Although Kime is well regarded for what it teaches, when increasingly higher density data devices are formed, a number of factors not normally at issue arise. For example, the preset inventors have found that unavoidable variation in web surface texture and web thickness exist and can interfere with fine microstructure reproduction. These variations result in locally, non-uniform contact pressure between the web and stamper. In a process where the web is softened to form the microstructures, simply increasing the average contact pressure fails to adequately solve this problem, as excessively high contact pressure may result in a distorted image of the surface due to elastic rebound within the web material after pressure is removed. Stamper web relative movement can also cause 'smearing'. Smearing distorts the shape of the data tracks and/or pits on a microscopic scale. These distortions can interfere with tracking and can also increase read-back error rates. Accordingly, there is a need for a method and/or apparatus, which accommodates the negative effects produced by variations in web surface texture and web thickness.

In order to accurately replicate stamper microstructure, many have tried to keep the stamper in contact with the web long enough for the displaced polymer to relax and the substrate cool. However, it was found by the present inventors that simply increasing contact time is not an acceptable solution due to the resultant increase in warp. As may be appreciated, a warped disk produces significant read problems. Warp related problems become even a greater problem with writeable disks, where the quality of the recording can be degraded and compounds the detrimental influence of warp during read-back. Accordingly, there is a need for a continuous method for producing optical memory and/or apparatus which limits warp during substrate formation.

SUMMARY OF THE INVENTION

In response to the foregoing issues, the present invention provides a method and/or apparatus for the continuous manufacturing of optical memory or optical memory substrates, and/or optical disks which includes supplying a web of material to a substrate forming apparatus.

In one aspect of the present invention there is provided a method for forming polymeric material by limiting the thermal load to the web.

In another aspect of the present invention there is provided a method for forming polymeric material by melt forming microstructures on the surface of a web of material.

In another aspect of the present invention there is provided a method of forming microstructures on the surface of polymeric material with an inductively heated stamper.

In another aspect of the present invention there is provided a method of forming microstructures on the surface of a web of polymeric material by providing a web of polymeric material with a surface having a flow enhancer; and forming microstructures on the surface of the polymeric material with a heated stamper.

In another aspect of the present invention there is provided a method of making a stamper for use in a continuous web forming process which includes providing a stamper with a transferable image; curving the stamper; and increasing the thickness of the stamper after it is curved.

In another aspect of the present invention there is provided a method of forming polymeric material by providing a stamper with limited thermal expansion/contraction during web formation. In a preferred aspect hereof, the stamper has a lower coefficient of thermal expansion than nickel. In another preferred aspect hereof, the stamper has a limited temperature change during contact with the web.

In another aspect of the present invention there is provided an apparatus for forming microstructures on the surface of polymeric material which includes: a web feed; a device for web forming, the device for web forming having a stamper and a set of nip rollers which form a nip zone in communication with the web feed, the stamper being carried by a support that is detached from the nip rollers.

In another aspect of the present invention there is provided an apparatus for use in making optical memory which includes: a web feed; a stamper for forming polymeric material, the stamper being carried on a loop and in communication with the web feed; a web cutter for sectioning web material after forming; and a collector for accumulating for sections of web material after cutting.

In another aspect of the present invention there is provided a method of forming microstructures on the surface of polymeric material for use in optical memory which includes the steps of: providing a roll of polymeric web material with a removable layer of softer material; and forming the web with a heated stamper; and re-rolling the formed polymeric material.

In another aspect of the present invention there is provided an apparatus for use in making optical memory which includes: a web feed; a stamper for forming polymeric material, the stamper being carried on a loop and in communication with the web feed; a web cutter for segmenting web material after forming; an accumulator for receiving sections of web material after cutting; an indexer for making registration holes in sections of web material; a masking station for covering sections of web material after forming; and at least one coating applicator for applying thin film to sections of web material after masking.

In another aspect of the present invention there is provided a web sectioning station for use in making optical memory from a continuous web process which includes: a platform for supporting sections of formed web material; a plurality of optical positioning sensors for centering the image of formed web material on a die path; and a die for cutting web supported on the platform.

In another aspect of the present invention there is provided a method of forming polymeric material for use in optical making memory by providing a nip zone with enough compliance so as to take into consideration variations in the surface and the thickness of the web.

In another aspect of the present invention there is provided a method of forming microstructures on the surface of polymeric material for use in optical memory, which includes the steps of: providing a web of polymeric material; providing a heated stamper; and pressing the heated stamper and the substrate between a set of nip rollers, wherein at least one of the nip rollers has a compliant outer surface with a hardness of 80 shore D or less.

In another aspect of the present invention, there is provided a system for making optical memory disks, which includes one or more of the following: a coating(s) applicator(s), a web cutting device(s), a cassette accumulating device, a web indexer, a take-up roll, and other components which can produce a finished optical memory disks or a partially finished disks.

In another aspect of the present invention there is provided a method for coating embossed optical memory substrates by masking sections of web material prior to coating.

BRIEF DESCRIPTION OF THE DRAWINGS

In order to assist in the understanding of the various aspects of the present invention and various embodiments thereof, reference is now be made to the appended drawings, in which like reference numerals refer to like elements. The drawings are exemplary only, and should not be construed as limiting the invention.

DETAILED DESCRIPTION OF PREFERRED EMBODIMENTS

Reference is now made in more detail to the various aspects and several embodiments of the present invention(s).

Figure 1:
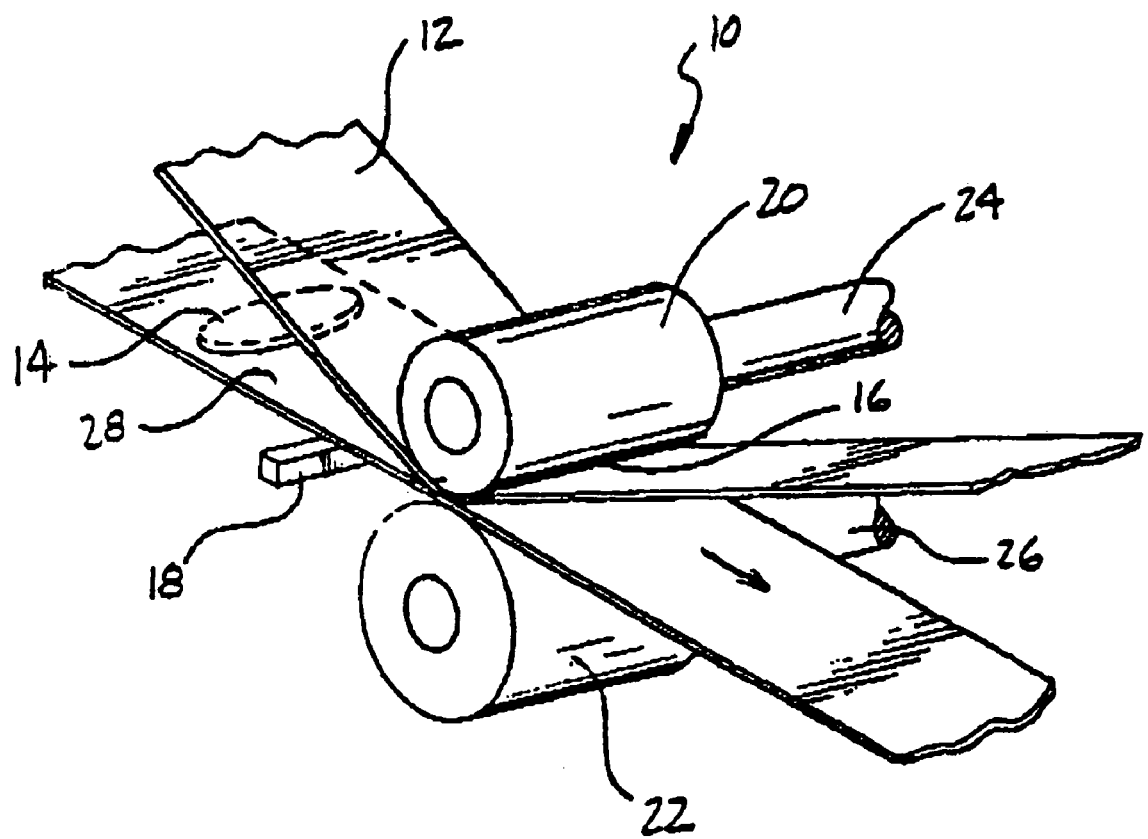
FIG. 1 is a perspective view of an apparatus for forming web material for use in optical memory in accordance with the present invention.

Referring now to FIG. 1, depicted therein is a device for forming optical memory in accordance with the present invention. The device includes a web payoff device, or simply a web payoff (not shown), a web path in which web material 12 travels, and a web forming apparatus disposed in the web path. The web forming apparatus 10 includes a stamper 14. The stamper carries a microstructure image for forming web. The stamper is carried by a support 28 and may be heated by any suitable heating device 18 and/or may also be heated by a drum or roller 22 in thermal contact with the stamper.

A pressure roller 20 and a backing roller 22 may be disposed in the web path to press the stamper into the surface of web material. The pressure roller and the backing roller form a nip zone 16. As shown, the nip zone 16 includes the narrowest region between the pressure roller 20 and the backing roller 22. In practice though, the nip zone 16 may be provided by any means suitable for pressing the stamper and the web material together.

Figure 13:
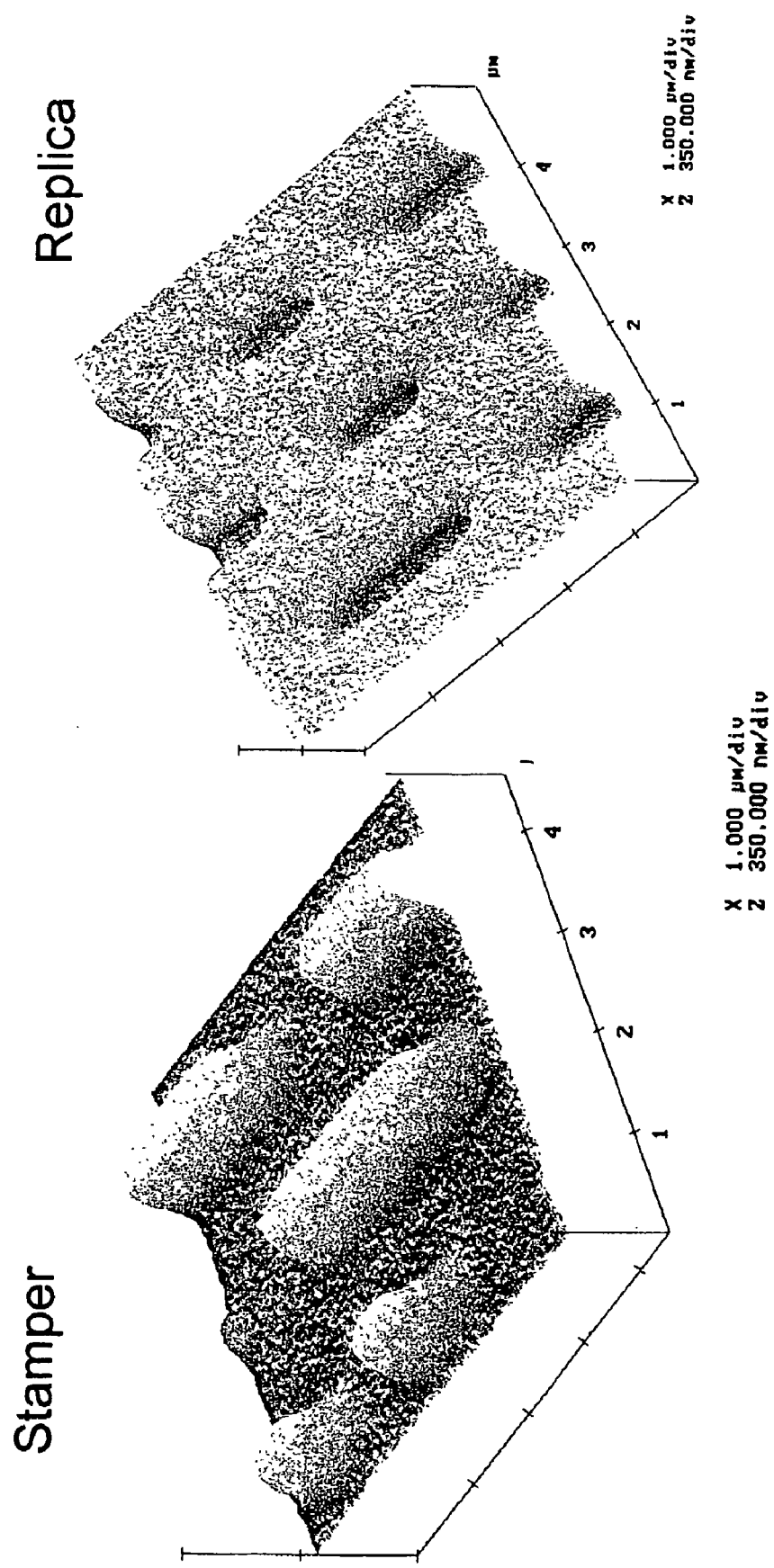
FIG. 13 is a perspective view of a stamper surface and a web surface after embossing in accordance with the present invention.

The stamper is any tool suitable for leaving an impression in web material or optical memory substrate. The stamper is preferably a disk shaped embossing tool, although in alternative embodiments the stamper could have any shape, such an oblate disk, oval, rectangle, triangle, irregular, etc. The stamper preferably has fine features for producing microstructures in optical memory substrates, such as grooves and/or pits. The fine features may range from greater than several microns to 0.01 microns or less in width, length and depth. FIG. 13 shows an AFM magnified perspective view of a stamper surface having fine features and a web surface which has been embossed with the hot stamper to incorporate the fine features into the surface of optical quality web material.

The stamper is preferably formed of a rigid material that can be heated to a peak process temperature while maintaining the ability to both form a microstructure on the surface of the web and to easily transfer energy to the interface between the stamper and web of polymeric material upon contact. Representative stamper materials include, nickel, chrome, cobalt, copper, iron, zinc, etc., and various alloys of these metals. The stamper may be composed of a single monolithic material, or of multiple layers of the same material or of different materials. The stamper is preferably comprised of a 0.1 to 1.0 mm thick plate of material, and is more preferably is comprised of an approximately 0.3 mm+/−0.1 mm thick plate of material. As shown in FIG. 1, the stamper is flat. It is also appreciated that in alternative embodiments, the stamper may be curved. A curved stamper allows the stamper to easily travel a curved path, such as a repeating loop on a drum, which is particularly useful for a continuous process.

In a preferred embodiment of the present invention, a curved stamper is preferentially formed to reduce elliptical image distortion. It has been found that simply bending a flat stamper to the shape of a carrier or drum can introduce elliptical distortion along the direction of curvature. The amount of ellipticity is related to the radius of curvature (for example, the radius of the drum or path of travel) and the thickness of the stamper at the time it is curved. It has also been found that stretching, compressing and/or elastically displacing the web material introduces image distortion which must be compensated for. A useful stamper preferably has micro-structural images with optimally compensating distortion so that the stamper is suitable for use in making optical memory disks. A curved stamper with optimally compensating distortion may be made by any suitable method, such as by altering the initial shape of the image and then forming the altered image on a curved stamper. However, to take advantage of current production systems for making flat stampers, a curved stamper is preferably made by imaging the optimally compensating microstructure pattern on a thin, flat stamper, then curving the stamper. After the stamper is curved, the thickness of the stamper is increased to bring the curved stamper to the desired thickness. By curving and then increasing the thickness of the curved stamper, the stamper may be preferentially formed to optimize image pre-distortion when used with a curved carrier while still meeting the necessary thermal and mechanical requirements. For example, an optimally compensating microstructure pattern is formed on a relatively thin workpiece (such as 0.1 mm or less in thickness). The relatively thin work piece is then curved to a desired radius of curvature (such as 1–10 inches and more preferably 1–5 inches) and then built up to the desired stamper thickness. The thickness of the curved stamper may be built-up by any suitable method, such as plating, bonding, soldering, coating, etc. The final stamper thickness is preferably 0.2 mm or greater and more preferably about 0.3 mm. The stamper thickness is preferably built-up on the back of the stamper, e.g. the side opposite the microstructure side. Forming the work piece to the shape of the curved carrier while it is relatively thin directly reduces undesired bending distortion on the image side of the stamper surface. Subsequent material addition to the rear surface of the pre-curved stamper permits mechanical and thermal characteristics to be changed without concern about excessive bending distortion. Additionally, in embodiments where the stamper is formed to be used with a curved carrier, a layered construction may additional provide other benefits, such as reduced distortion of the stamper upon heating and cooling or by changing the blank side to influence the lubricity of the stamper/drum interface as discussed in more detail herein below.

It has been found that image 'smearing' can occur from a differential motion between the stamper and the web during embossing. The present invention addresses problems, such as smearing, by providing a continuous web process for making optical memory, which includes a web forming apparatus adapted for reduced dimensional variation at the stamper/web interface. Although pure monolithic nickel stampers may work in conjunction with one or more of the embodiments of the present invention, it has been found that pure monolithic nickel stampers do not necessarily have optimum thermal expansion/contraction characteristics. Further, heat transfer from the stamper to other components of the web forming apparatus can have an impact on stamper contraction. Therefore, a preferred web forming apparatus provides limited thermal contraction of the stamper during contact with the web. In a preferred embodiment hereof, the web forming apparatus is adapted to provide less than 0.5%, more preferably less than 0.1% and more preferably less than 0.01% stamper contraction during web contact.

In a preferred embodiment hereof, stamper dimensional variation is limited by providing the stamper with a coefficient of thermal expansion (and contraction) substantially matched to the thermal response of the stamper/web interface. In certain circumstances, particularly when a very hot stamper is contacted to a cooler web or cooler press, the contact can cause the hot stamper to cool quickly and contract. The contraction is so great that image distortion can occur. By adjusting the thermal expansion/contraction properties of the stamper, reduced stamper/web differential motion upon stamper contact can be provided to improve image formation. In accordance with a preferred embodiment hereof, the stamper has a thermal contraction less than that of pure nickel or that of conventional nickel stampers. Thermal expansion/contraction is preferably less than 1%, more preferably less than 0.1% and more preferably less than 0.01% over web contact. Reduced thermal expansion and/or contraction may be provided by any suitable means, such as by forming the stamper from a material having a low coefficient of thermal expansion, or by forming the stamper as a multi-layered structure, etc. Reduced thermal expansion may be provided by making the stamper from an alloy, a ceramic, or coating the stamper with a different material having a low coefficient of thermal expansion. For example, a stamper may be made by coating a conventional nickel stamper with another metal, a metal alloy or a ceramic having a lower coefficient of thermal expansion. By selecting materials with a low coefficient of thermal expansion, a stamper with substantially no measurable relative contraction during web contact can be provided.

In another embodiment hereof, stamper dimensional variation may be reduced by limiting heat loss from the stamper to components of the web forming apparatus or the web or both. Heat loss may be limited in a number of ways including: providing a bias heat to the stamper backing roller; insulating the stamper from press components; and reducing the stamper contact time with the web. Particularly when the stamper is independently heated from the press or backing roller, heat can be drawn from the stamper into the backing roller to cause contraction of the stamper. By providing a bias heat to the stamper backing roller, heat transfer from the stamper can be limited to reduced thermal contraction of the stamper. Alternatively or additionally, the stamper may be thermally insulated from the backing roller. The stamper may be thermally insulated from the backing roller by any suitable means, such as coating the stamper with an insulator, coating the backing roller with an insulator, etc. Preferably heat loss from the stamper to the stamper backing roller is less than 50%, more preferably less than 10%, and more preferably to less than 1%.

It has been found that by decreasing the time of contact between the heated stamper and the web, reduced dimensional variation can be achieved by limiting heat loss from the bulk of the stamper. The decrease in stamper temperature or stamper bulk temperature is preferably 50° C. or less, more preferably 25° C. or less and more preferably 10° C. or less. Decreased contact time may be effected by increasing the speed of the web and/or increasing the speed of the loop on which the stamper is carried. However, it may be beneficial to also increase the amount of heat carried by the stamper when increasing speed so as to carry enough energy to melt flow the surface of the web as desired. The longitudinal (web motion direction) contact of the web with the stamper in the nip zone is preferably short in both length and time. The web preferably travels at a rate of 3 to 30 inches per second. The contact time between the stamper and the web is preferably 300 milliseconds or less, and more preferably 20 milliseconds or less. The contact time is most preferably 10 milliseconds or less, but is preferably greater than 0.5 millisecond. Particularly when the stamper and web are pressed together in a nip or nip zone, the length of longitudinal contact is preferably 20 mm or less, and more preferably 5 mm or less. By limiting contact (such as the length and/or time) of the web and the stamper, reduced substrate warp may be realized.

The stamper can be carried through the nip zone by any suitable means. Referring again to FIG. 1, the stamper 14 is carried through the nip zone 16 by a support 28. The support may be a web, sheet, chain, belt, pallets, "ferris wheel configuration", carriage, hoop, rails, drum, roll, etc. The support 28 is preferably a closed loop for repeatedly passing the stamper 14 through the nip zone 16. As shown in FIG. 1, the support 28 is a flat sheet. In alternative embodiments, such as those shown in FIGS. 2 and 4, the support 28 may be a carriage.

The stamper may be compressed against the web by any suitable press or pressing device. The device for pressing is preferably a set of rollers which form a pinch point or nip. The press preferably delivers a pressure of 500 PLI (pounds per lineal inch) or less to the stamper/web contact zone. The nipping pressure is preferably in the range of 50 PLI to 300 PLI.

Figure 2:
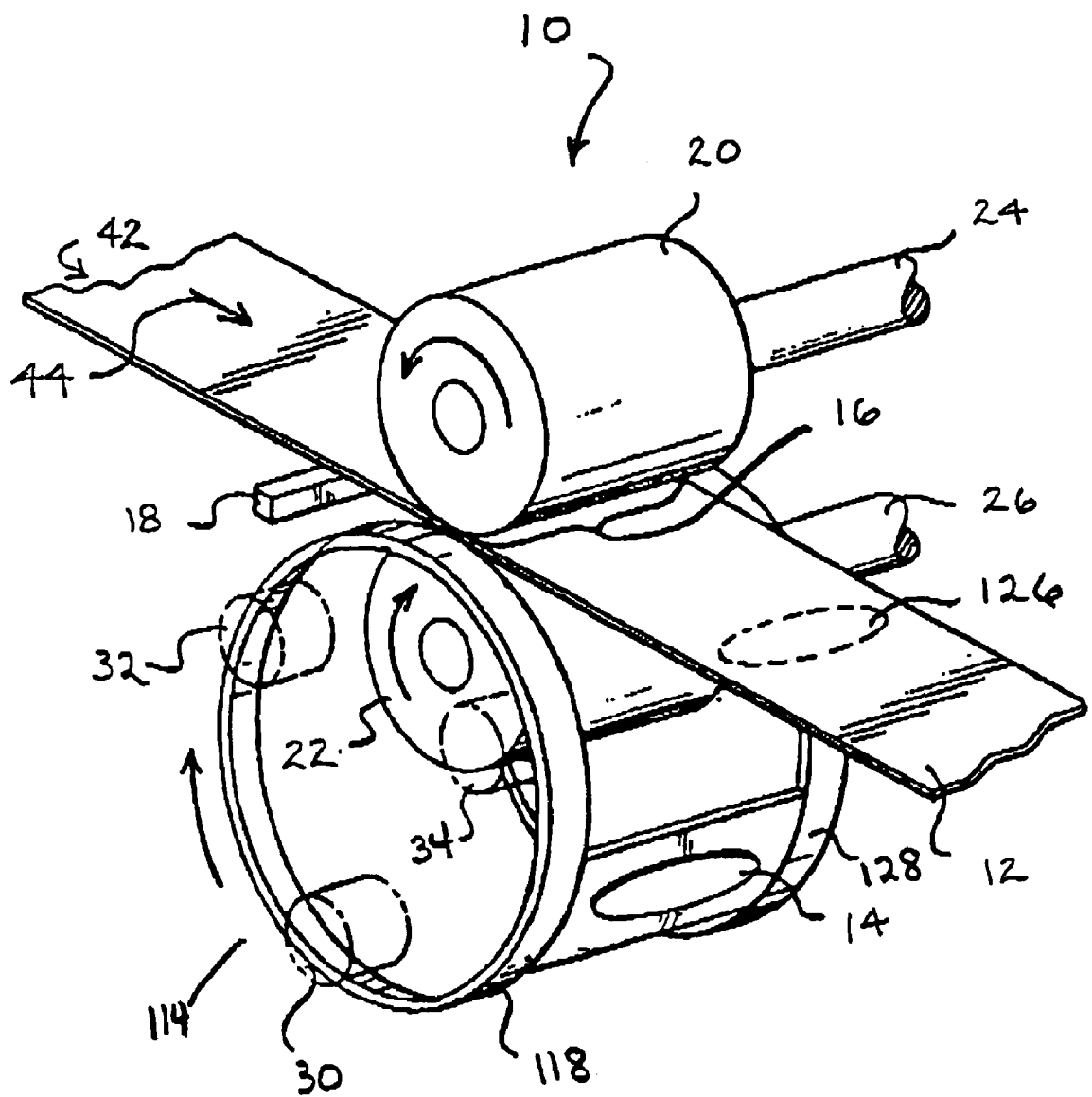
FIG. 2 is a perspective view of another apparatus for forming web material in accordance with the present invention.
Figure 4:
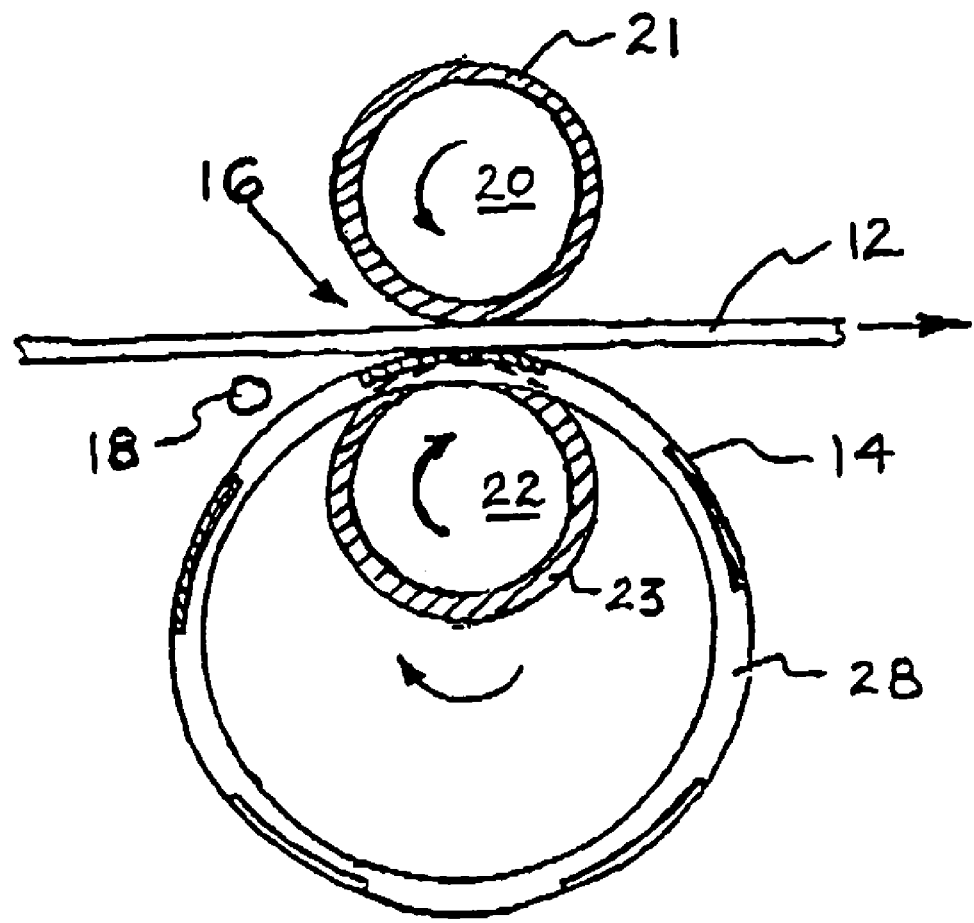
FIG. 4 is a side, plan view of an apparatus for forming web material in accordance with the present invention.

As shown in FIGS. 1, 2, and 4, the pressure roller 20 and the backing roller 22 provide a nip zone 16 for pressing the stamper and the web together. Particularly where the stamper and web are pressed together by a rounded press such as drums, the length of longitudinal contact is preferably 20 mm or less, more preferably 5 mm or less and more preferably 1–2 mm. The pressure roller 20 and the backing roller 22 are preferably drums or rollers constructed of rigid material, such as metals, alloys, ceramics, etc. The pressure roller 20 and the backing roller 22 preferably have a smooth finish. In a preferred embodiment, the backing roller 22 is coated with a material selected to effect an influence upon the time/temperature profile of the stamper/web interface (as described above) and/or to influence the lubricity of the stamper/drum interface, and/or to provide a compliant surface (as described below). The characteristics of the backing roller should prevent debris generation when contacting the stamper. Representative coating materials include chrome, cobalt, nickel, iron, steel, stainless steel, molybdenum, titanium, zirconium, zirconium oxide, silicon nitride, titanium nitride, synthetic diamond (DLC), Teflon or a Teflon filled matrix of the above or similar materials. The pressure roller 20 and the backing roller 22 are preferably rotatable. The rollers may be free rolling or may be rotated by one or more drives 24 and 26. The drives 24 and 26 are preferably independent of each other. If the backing roller 22 is heated with a bias temperature, it is preferably operated cooler than the peak process temperature achieved at the web/stamper interface side of the stamper 14. By actively controlling the temperature of the backing roller, improved microstructure reproduction may be achieved by limiting the heat transfer from the stamper to the backing roller.

A preferred method of forming web with a stamper and a set of nip rollers includes balancing stamper bending distortion against web stretching distortion by increasing nip pressure to counteract down-web stamper bending distortion and decreasing nip pressure to counteract cross-web or web displacement distortion. For example, a 55 shore D nipping roller is used with an 8" nip drum having a curved stamper. By varying the nipping force between 600 and 900 lbs, one can balance ellipticity between cross-web and down-web to improve image quality.

Although the apparatus disclosed herein may have wide application in forming web material of all kinds, the web material is preferably a polymeric material of suitable optical, mechanical and thermal properties for making optical memory disks. Preferably, the web material is a thermoplastic polymer, such as polycarbonate, poly methyl methacrylate, polyolefin, polyester, poly vinyl chloride, polysulfone, cellulosic substances, etc. The web material preferably has a refractive index suitable for use in optical memory disks (for example, 1.45 to 1.65). The web thickness is preferably about 0.05 mm to about 1.2 mm, depending upon the intended application. The web 12 is preferably wide enough for replicating one, two, three, four, or more images across the web. The web material may contain one or more additives, such as antioxidants, UV absorbers, UV stabilizers, fluorescent or absorbing dyes, anti-static additives release agents, fillers, plasticizers, softening agents, surface flow enhancers, etc. The web material is preferably a prefabricated roll formed "off-line", which may be supplied to the substrate forming apparatus at ambient temperature or may be supplied to the system at ambient temperature. Supplying the web material in the form of a roll to the system at ambient temperature allows for greater process flexibility and efficiency.

To form an impression, the stamper is heated with a heater before contacting the web. The heater may be any suitable heating device, such as a directed energy source, inductive heating source, conductive heating source, radiating heating source, etc., or any combination or equivalent. The stamper is, preferably, independently heated from the other elements of the system, including the nip, web, rollers, etc. The stamper is preferably heated just before it is carried to the nip zone. Preferably, the backing drum is also heated.

Heating is preferably supplied by an induction heating coil that produces direct resistive heating of the stamper. The induction heating coil is preferably made with a conductive material, such as copper, aluminum, silver, etc. The induction heating coil may be comprised of a series of contoured conductors which are coupled to a suitable source of energy. The induction heating coil is preferably water cooled. The induction heating coil is preferably placed adjacent to the stamper so as to generate resistive heating in the stamper when the induction heating coil is energized. The induction heating coil is preferably placed within 1 mm to 50 mm of the stamper. As the stamper is heated by the induction heating coil it can be raised to a temperature sufficient to melt flow the surface of the web. The amount and uniformity of coupling to the stamper can be selected by adjusting the size and geometry of the induction coil; by appropriately selecting the materials of the stamper; and by changing the distance between the stamper and the induction heating coil. As shown in the FIGS. 1, 2 and 4, the induction heating coil 18 is disposed up-stream from the replication zone and adjacent to the path of the stamper.

During embossing, web warp can result from excessive shrinkage and/or sub-surface annealing of the web material. Even minor amounts of substrate warp can be problematic for optical memory devices. The present invention contemplates several methods for reducing the likelihood of warp. These methods include one or more of the following: controlling the stamper/web interface temperature vs. time relationship as the web moves through the nip zone, shortening the total processing time at a temperature above the glass transition temperature, $T_g$, and/or limiting the depth to which the web is heated above $T_g$. Web warp may also be reduced by altering the web wrap angle, and/or additionally heating the web on both sides. Each of these methods may be used separately of in combination to improve replica image formation and to reduce warp.

In accordance with the present invention, there is provided a method of forming polymeric web substrates by melt flowing the surface of the web. Melt flow formation is a process wherein the surface of the web material is heated to a melt, displaced and then allowed to stabilize. As may be noted, forming polymeric substrates by interface surface melt flow is different than traditional compression relaxation methods. In melt flow, as the stamper impinges upon the web, the surface of the web is heated to such a degree that the material melts and locally flows. The combination of material displacement and local flow allows the web surface to rapidly and accurately conform to the shape of the microstructure pattern on the stamper. Before stamper separation occurs, the web surface is allowed to stabilize. In comparison, compression relaxation processes use force to distort and displace material for a time, at a temp below the melting or flow temp, that allows for relaxation of the strain generated in the web by the compressive forces. By using melt flow formation, instead of compression relaxation, the time needed for image formation can be greatly shorted so as to limit bulk heating of the web.

In a preferred embodiment of a method for melt flow formation, the surface of the stamper is provided at melt flow temperature (Tf) or above. Momentarily raising the stamper/web interface temperature to Tf or above allows rapid, stress free formation of the web surface to the shape of the microstructures of the stamper. While the stamper/web interface should be hot enough to cause the surface of the web to melt and flow, it should not be so hot that the entire cross section of the web is melted. The web is preferably melt flowed from the interface surface down to a depth of 0.2 mm or less, more preferably down to a depth of 0.1 mm or less, more preferably still down to a depth of 0.05 mm or less, and most preferably down to a depth of 1 μm or less. Limiting the process thermal penetration depth to a minimum, such as to the depth of the structures being formed, can minimize sub-surface displacement and subsurface annealing of the material to reduce distortion and warp.

Figure 3:
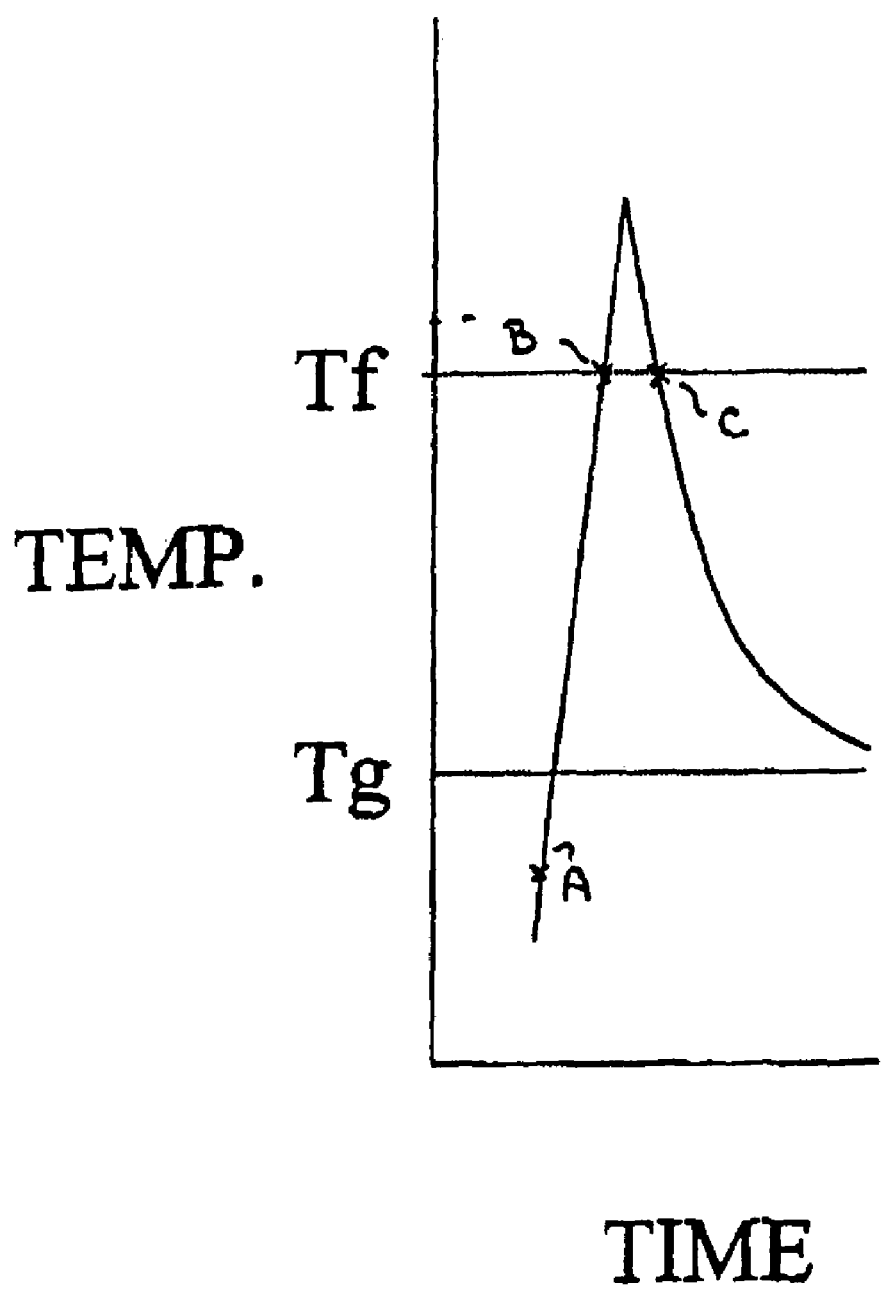
FIG. 3 is a graphical view of a Time vs. Temperature profile for web surface, melt forming in accordance with the present invention.

The melt flow time/temperature profile may be provided in a number of ways, including balancing stamper peak temperature with stamper thermal properties, adjusting the initial temperature and thermal response of the web, adjusting the initial temperature and thermal response of the stamper/web interface, and/or altering the thermal characteristics of the rollers that form the nip zone. FIG. 3 exemplifies a time/temperature profile of a method of melt forming in accordance with a preferred embodiment of the present invention. As shown, the temperature of the web surface (y-axis) during embossing is taken over time (x-axis). Within the contact time, the temperature of the web surface is ramped from near ambient or Tcold (point A of the graph) to at or above Tf (point B of the graph) and is then [quickly] cooled to stabilize the image before the stamper separates from the web. Alternatively, the web may be preheated to above ambient, or to even above Tg before contacting the stamper to the web. Preferably the web surface temperature is dropped to Tf or below before the stamper separates from the web (shown by point C of the graph).

The stamper is preferably separated from the web at an interface temperature below the melt-flow temperature of the web (e.g. at a temperature less than Tf). It should be generally noted that interface cooling rate may be affected by a number of conditions, including: thermal conduction into the web, the thermal characteristics of the web/stamper interface, thermal conductivity of the stamper, supplying one or more insulating layers, and by active interface temperature control. The stamper is preferably separated at a temperature higher than the glass transition temperature Tg. Due to the low formation stress associated with melt forming, the processed surface of the web is able to maintain its microstructure after separating from the stamper while continuing to cool.

Although not desiring to be bound by theory, polymer response to a displacing force involves a viscous component and an elastic component. At Tf the viscous component dominates, and at Tcold (a temperature below Tg) the elastic component dominates. Above Tg (the glass transition temperature) a transition occurs where the increase in free volume allows rotational or translational molecular motion to take place. This freedom allows molecules to move past one another, causing viscous behavior to become more dominant. Embossing polymeric material at Ts or Tsoft (a temperature below Tf but above Tg) requires substantial relaxation of strain before stamper separation. In comparison, various embodiments of the present invention contemplate embossing the disk substrate at Tf or above, and cooling the stamper/web laminate to below Tf, but not necessarily below Tg, before separation. The optimum temperature points reached in various embodiments of the present invention permit the microstructures in the web to stabilize sufficiently after separation so as to hold their shape, while at the same time avoiding microscopic and macroscopic distortion related to stamper shrinkage. The melt forming process of the present invention tends to eliminate polymer relaxation time constraints associated with traditional "hot embossing" by providing a low viscosity interface at the stamper. Melt forming also improves process tolerance to web thickness and texture variation by reforming the surface. Melt forming can also take advantage of the increased surface mobility and rapid re-stabilization of the surface before stamper/web separation. By controlling the time/temperature profile of the stamper/web interface, microstructures on the stamper may be transferred to the web with reduced defects, such as micro-smearing, track shape distortion, and warp. An additional benefit derived from a short time/high temperature thermal profile is a limited thermal penetration depth into the web material. A limited thermal penetration can aid in reducing sub-surface annealing of the polymer which has been found to be a contributor to total warp. Faster melt forming can lower the overall thermal load delivered to the web. A lowered thermal load can reduce the depth of thermal penetration. While it is possible to reduce average thermal exposure by modifying the shape of the time/temperature profile to achieve extremely high peak temperature at the surface followed by a rapid cooling, this approach may have a practical limit imposed by the instability of certain polymers to excessively high peak temperature.

Although a wide range of temperature vs. time profiles can be achieved through the appropriate selection of materials, excessively high peak temperature is still undesirable. It has been found that melt flow formation may be more easily provided if the difference between Tf and Tg can be temporarily reduced without compromising the bulk physical properties of the web polymer. Applicants have discovered that the selective application of a flow enhancer to the surface of the web prior to melt forming may reduce the required melt-forming peak temperature without compromising the bulk physical properties of the web polymer. To accommodate increasingly better flow dynamics without the undesired consequences of over heating, it has been found that additives to the web surface or surface region to temporarily enhance flow characteristics may be used.

The web material is preferably provided with a flow enhancer. The flow enhancer may be any material or composition added to the web that provides enhanced flow characteristics over the basic web material under melt-flow conditions. The flow enhancer is preferably a substance that effectively decreases the melt-flow temperature of the surface and/or is a substance that increases the cooling rate of the surface. The flow enhancer is preferably provided in an amount sufficient to reduce the dynamic viscosity of the web at a given temperature. Flow enhancer is preferably provided at 0.1 to 1.0% by weight in the surface region of the web. Accordingly, the web material preferably has at least enough flow enhancer to lower Tf below reported values for dry or flow enhancer free material and is preferably provided in an amount sufficient to lower normal peak process temperature by 5% to 50%. By providing an amount of flow enhancer sufficient to modify the melt flow characteristics of the web, improved optical memory quality microstructures can be produced by melt forming.

The flow enhancer is preferably provided on or in the web surface down to a depth. The flow enhancer is preferably provided to a depth of the features being produced or just below the features being produced. The flow enhancer is preferably provided to a depth of at least 0.003 µm. The flow enhancer may be provided throughout the entire cross-section of the web, but is preferably provided to the top 50% or less, more preferably to the top 10% or less. The flow enhancer is preferably provided from the surface to a depth of 10 µm, and more preferably provided from the surface to a depth of 3 µm. In a preferred application, only the first 1.5 µm of the surface region has flow enhancer.

Water has been found to be a particularly useful flow enhancer. Not only has water been found to be an effective flow enhancer, but water can beneficially alter the time/temperature profile at the web/stamper interface by actively cooling the web surface to create an impediment to continued heat transfer from the stamper. Further, it is believed that water's high heat of vaporization can enhance rapid cooling at the stamper/web interface to reduce image stabilization time. Traditionally, water present in web materials during hot embossing is highly problematic, as water trapped in the web can vaporize and create gas bubbles. These bubbles typically form at the interface between the web and stamper, creating concave depressions in the web surface. These gas bubbles in turn degrade the optical quality of the final product. Typical solutions to the water problem have been to either remove the water by drying the web or by processing the web at relatively low temperatures (below Tg). The applicants have discovered that the presence of water in the surface of the web during melt forming can actually be beneficial, as the right amount of water can not only improve the quality of the microstructures transferred to the web, but can do so without the formation of water vapor bubbles. Prevention of damaging water volatilization may be achieved by providing a short process time with a shallow depth of thermal penetration. Because the efficacy of the melt-forming process is enhanced by the presence of water, peak process temperature can be reduced. The reduction in peak temperature requirements further reduces thermal penetration, thereby resulting in less warp. Water is preferably provided in an amount of about 0.1 to 0.4 percent by weight of web material. To provide a preferred amount of water in the surface of the web, moisture may be added, removed, or both. In some cases, the web may be dried prior to embossing. In other instances, the web may be subjected to a water surface treatment prior to embossing. In other cases, it may be necessary to surface condition the web by first drying the web and then treating the pre-dried web with water just prior to embossing.

It is also appreciated that although water is a preferred substance, other flow enhancers may also be used. Other flow enhancers, include plasticizers, resin emulsions, and release agents that are applied to the surface or integrated with the surface of the web in proper amounts. Preferred flow enhancers may include one or more compounds selected from the chemical families of fatty esters and fatty acids. A preferred flow enhancer includes the fatty ester, pentaerythrithitol tetrastearate. The flow enhancer may be supplied to the web by any suitable means, such as dipping, coating, spray application, a fine mist, absorption, immersion in a wetter augmented bath, vaporization chamber, addition to the initial plastic resins, addition to the initial extrusion raw materials, etc. The flow enhancer is preferably applied in a way that provides an even coating of material on the surface of the web material. Preferably the flow enhancer provides properties suitable for temporarily lowering effective web Tf during the melt-forming process, and/or, as a result of process conditions, results in a permanent increase in web surface Tg.

To achieve preferred temperature profiles during web formation, the rollers or drums that form the nip zone may be adapted with thermal transfer properties sufficient to maintain proper heating and cooling of the web/stamper interface, such as active or passive heating or cooling. Referring to FIG. 4, the rollers 20 and 22 may be thermally conductive and provided with an outer layer 21 and an insulator layer 23 (respectively) which are selected so that there is just enough thermal insulation to allow the web surface to cool to below its melt flow temperature (Tf), but not necessarily below its glass transition temperature (Tg), by the time the stamper 14 separates from the web 12. If either the outer layer 21 or the insulator layer 23 is overly insulating, the web surface may not cool sufficiently to fully stabilize by the time the stamper 14 is separated from the web, allowing the microstructure to change shape. If the outer layer 21 or the insulator layer 23 is under insulated, the stamper 14 may cool so much that it shrinks before it comes out of contact with the web, resulting in smearing of the microstructure and distortion of the shape of the tracks.

In a preferred embodiment of a method for forming polymeric web material, the web is also heated on the side opposite that where microstructures are formed, e.g. on the 'blank side'. Heating on the 'blank-side' of the web allows for counteracting residual warping forces from post anneal cooling. Heat may be provided to the blank side by any suitable heating device. Heat is preferably provided by either radiant heat or may be provided to the web by a heated roller configured to counteract the thermal penetration depth resulting from stamper contact. The blank side of the web may be heated prior to entering the process nip zone, such as by radiant heat or conductive heat, or may be heated in the process nip zone simultaneously with microstructure formation. The blank side is preferably heated in an amount sufficient to balance sub-surface annealing created on the stamper side. The blank side may also be heated in the same way as the stamper is heated, such as by induction heating. This approach may be extended to effect the simultaneous melt forming of both sides of the web.

In practice, web material can be delivered to the nip zone by any suitable web feed means. The means for feeding is preferably a device suitable for continuously delivering web material to the stamper along the web path, such as a sheet feed, folded material feed, roll feed, web extruder, etc. The web feed is preferably a roll feed, such as one shown at 300 in FIGS. 5 and 9 for feeding pre-manufactured rolls of polymeric web material to the nip zone. The roll of polymeric web material preferably includes a removable film or protective layer of material, such as a softer plastic film layer on the web. By using web having a softer protective layer, the web may be rolled, unrolled, and re-rolled with minimal to no surface scratching, which could otherwise affect the use of the web for optical memory devices.

The web feed may be complimented by a web take-up device, such as a take-up roll, for collecting the web after processing or after formation. Alternatively to using a take-up roll, the web may be cut into sections after formation (such as described below) or may be further processed into completed or partially completed optical memory disks.

The web formation apparatus is preferably adapted to accommodate variations in web tension so that the web is neither over-taunt nor over-slacked. An over-taught web could result in the web breaking while an over-slacked web could cause jamming or other problems. Furthermore, tension control across the nip zone should be controlled to reduce sub-surface material displacement and ellipticity of the reproduced image. To accommodate variations in web tension, the system may be provided with one or more tension rollers. Tension rollers are generally known in material handling operations and may be used to control web speed and tension.

Tension may be controlled across the nip zone, at the nip in-feed, at the nip out-feed, and otherwise across the system. Tension at the nip in-feed is preferably near 0 to neutral. The system may also have one or more guide rollers (not shown) for guiding the web in the web path, for altering the angle of the web into and out of the nip zone and for changing direction of the web. Preferably, there is at least one guide and/or tension roller for directing the web into the process nip zone, and at least one guide and/or tension roller used to direct the web out of the nip zone. These guide and/or tension rollers may serve the additional purpose of establishing the process nip zone in-feed and out-feed contact and separation angle between the web and stamper. The guide roller on the side exiting the nip zone preferably allows an initial web/stamper separation angle of about 90°+/−1°. The guide roller preferably guides the web away from the stamper immediately after exiting the nip.

Referring to FIGS. 1, 2, and 4, the heated stamper 14 is carried into the nip zone 16 by a support 28. The stamper 14 is preferably temporarily laminated to the web 12 as a result of free float through the nip zone. The support 28 is preferably independent of, or detached from, the nip rollers, 20 and 22, and any components thereof. The independence of the support 28 may allow the stamper 14 to substantially free float on the web 12 as it becomes temporarily laminated thereto in the process nip zone 16. By laminating the stamper to the web with an independent support, a stamper with more than one degree and more preferably more than 2 degrees of freedom of movement may be realized. By having more than one degree of freedom, the stamper 14 can better accommodate and conform to roller pressure-induced distortions within the web 12 during the melt forming process and more completely accommodate web texture and thickness variations.

Referring now to FIG. 2, depicted therein is a web forming system in accordance with a preferred embodiment of the present invention which includes a web forming apparatus 10 having a special support that decreases the angle in which the stamper enters the nip zone 16. The system includes a web feed 42, a web path 44 in communication with the web feed 42, and a nip or a nip zone 16 disposed in the web path 44 and a stamper 14. The stamper 14 is carried by a set of "hoops" 118, 128 which forms the support that follows the web path 44 through the nip zone 16 and carries the stamper 14 between the pressure and backing rollers, 20 and 22. The support is preferably detached from the pressure and backing rollers, 20 and 22, and preferably results in the temporary lamination of the stamper 14 to the surface of the web 12 in the nip zone 16. As shown, the hoops form a carriage 114 for the stamper to ride on. The carriage 114 provides means for independently carrying the stamper through the nip zone 16. By independently carrying the stamper 14 into and through the nip zone, better thermal management of the process can be provided. Additionally, by independently carrying the stamper 14 through the nip zone, the stamper may be kept more nearly flat, thereby reducing ellipticity caused by forming a curved stamper in the shape of a small diameter carrier drum.

As shown, the carriage 114 is supported around the backing roller 22 on a plurality of rollers 30, 32, 34. The rollers 30, 32, 34, permit free rotation of the rails 118, 128. The stamper 14 may be connected between and supported by the rails 118, 128 by any suitable means. The rails are preferably separated by a distance equal to the width (cross web) of the backing roller 20 so that only the stamper (as opposed to the rails) contacts the backing roller during operation. The rails 118, 128 preferably have a circumference substantially greater than that of the backing roller 22. The ratio of the circumference of the rails to the backing roller is preferably at least 5:4, and more preferably a ratio of about 13:8 or greater. Rails with a large circumference may aid in keeping the stamper flatter through the nip zone 16.

In operation, the backing roller 22 engages the back of the stamper 14 to guide the stamper into contact with the web 12 while the pressure roller 20 presses the web into the front of the stamper. The roller surfaces are preferably selected to provide the necessary contact uniformity, to optimize nip zone dynamic shape and to balance pressure distribution to minimize overall image distortion. The pressure roller and/or the backing roller preferably include compliant surfaces. A pressure roller and/or backing roller with a compliant surface can provide a stamper with enough flexibility so as to accommodate web thickness variations to improve image formation. The compliant material is preferably between 0.05 and 0.5 inches thick and more preferably approximately 0.125±0.1 inches thick. The compliant material 21 is preferably selected to have a hardness rating of less than 80 shore D and preferably between 90 shore A and 60 shore D. The backing roller 22 may also include a layer of compliant material 23 which may be the same as or different from (in thickness, compliance, resiliency, lubricity, and/or heat transfer characteristics) the compliant material of the pressure roller. If both rollers have compliant surfaces, the surfaces are preferably adapted such that the combined characteristics optimize pressure and heat transfer uniformity without introducing pressure, shearing, and/or velocity instabilities into the stamper/web laminate. Preferred compliant materials include, but are not limited to, nitrile, EPDM, Kapton, epoxies, filled epoxies, Teflon, and Teflon infused polymer, metal or ceramic matrixes. It is also appreciated that any material with compliance and heat transfer properties suitable for melt forming an optical memory microstructure with less than ±0.8 degrees of radial deviation, and less than ±0.3 degrees of tangential deviation may be used.

Figure 5:
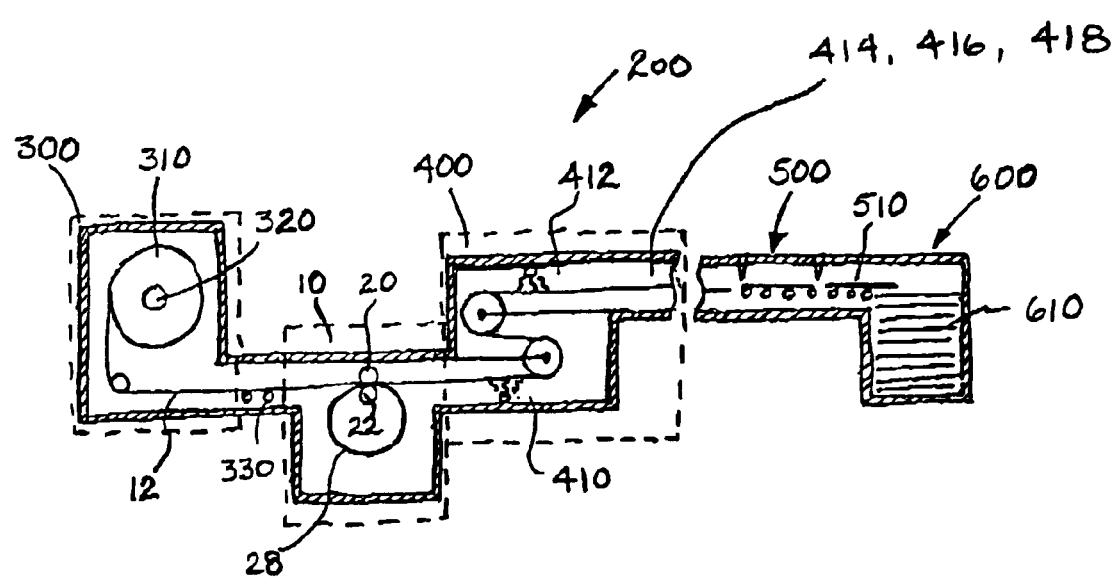
FIG. 5 is a side view of a continuous web, optical memory production line in accordance with the present invention.

With reference to FIG. 5, a preferred embodiment of a system for manufacturing optical memory media 200 is shown. The system 200 includes a web pay-off 300, web material forming apparatus 10, a coating(s) applicator 400, a web cutting device 500, and a cassette loading or accumulating device 600. The system 200 may be used to process a continuous web 12 of material to produce finished optical memory storage media, such as optical disks.

As shown in FIG. 5, a roll 310 of web material 12 is provided by a web pay-off device 300. The web material 12 may be of any width and thickness that is useful for manufacturing optical memory substrates. The roll 310 may be interchangeably mounted on a reel 320 contained in the pay-off device 300. The web material 12 dispensed from the roll 310 may be run through one or more guide/tension rollers 330 to the forming apparatus 10.

As various embodiments of substrate forming apparatus have been discussed previously, it is appreciated that any of the embodiments of web forming apparatus, which have been previously discussed, could be used with the system 200 described herein. The forming apparatus 10 receives web material from the web pay-off device 300. The disk substrate forming apparatus 10 is used to form a pattern of microstructures into the web material. After the microstructures are formed in the web material, the material may be further processed to more fully complete the manufacture of an optical memory device. To process the web material further, the material may be sent to a coating application 400.

Various coatings may be applied to the web material in either a continuous manner, such as to the web before sectioning into strips of web material, or after sectioning by batch. The coating applicator 400 may include one or more coating units 410, 412, etc., used to apply coatings to the web 12. The coating units may be capable of maintaining a vacuum surrounding the web 12 and applying a coating using a one or more coating processes, such as CVD, PVD, PCVD, PECVD, PML, LML, sputtering, or other deposition process.

Table 1 below identifies example processes, coatings, and coating thickness that may be used to form desired coatings on phase change, optical memory substrates.

TABLE 1

| Coating Step | Process | Coating | Thickness (nm) |
|---|---|---|---|
| 1 | Microwave PECVD | Dielectric anti-reflective | 60–150 |
| 2 | Sputter | Chalcogenide | 20–25 |
| 3 | Microwave PECVD | Dielectric | 20–25 |
| 4 | Sputter | Aluminum | 60–150 |
| 5 | PML/LML | Acrylate | 5,000–7,000 |

A coating unit 410 may be used to apply a dielectric anti-reflective coating in the range of approximately 500 to 2000 angstroms thick and more preferably in the range of 60 to 150 nanometers thick. The dielectric coating may be comprised of any suitable material such as silicon dioxide, silicon nitride, titanium oxide, zinc sulfide, silicon oxide, germanium nitride, germanium oxide, silica, alumina, combinations of the above, and the like. Preferably, the dielectric anti-reflective coating has an index of refraction of about 2.2. For this reason, silicon nitride, which can be deposited with an index of refraction of about 1.9, and titanium oxide, which can be deposited with an index of refraction of about 2.3, may be preferred.

Although any type of deposition process may be used to apply the dielectric anti-reflective layer, in a preferred embodiment, microwave PECVD process is used. Examples of microwave PECVD processes and systems that may be used for coating include those disclosed in U.S. Pat. Nos. 5,411,591; 5,562,776; 5,567,241; 5,670,224; 6,186,090; and 6,209,482, the disclosure of each of which is incorporated by reference herein. Microwave PECVD processes such as those disclosed in the above-referenced patents may be preferred over other deposition techniques because of the speed at which the deposition can be carried out. An increase in deposition rates may also allow a reduction in the overall length of the deposition chamber required for coating. Reduction in the deposition chamber length can greatly decrease the costs associated with the deposition process.

A memory layer coating unit 412 may be used to apply a phase change memory material coating. The memory material coating preferably includes a chalcogenide alloy in the range of approximately 4 to 30 nanometers thick, and more preferably approximately 20 to 25 nanometers thick. Although any type of deposition process may be used to apply the chalcogenide alloy coating, in a preferred embodiment it is sputtered onto the web 12.

A second dielectric coating unit 414 may be used to apply a second dielectric coating in the range of approximately 150 to 2000 angstroms thick, and more preferably approximately 20–25 nanometers thick. Suitable dielectric materials include those described above. Although any type of deposition process may be used to apply the second dielectric layer, in a preferred embodiment, a microwave PECVD process is used.

A coating unit 416 for depositing a reflective or heat dissipation material may be used to apply a thin layer of a metal, such as aluminum or the like, in the range of approximately 1 to 1000 nanometers thick, and more preferably approximately 60 to 150 nanometers thick to the substrate. Although any type of deposition process may be used to apply any suitable material coating, in a preferred embodiment the reflective or heat dissipating layer is sputtered or evaporated onto the web 12.

A coating unit 418 may be used to apply a protective coating. The protective coating is preferably 1,000 to 7,000 nanometers thick. The protective coating may be formed of any suitable, optically transparent material, such as a thermosetting resin, uv resin, acrylate, etc. In a preferred embodiment, a Polymer Multi-Layer or Liquid Multi-Layer (PML/LML) process is used to provide the acrylate coating. A PML process involves the vacuum flash evaporation of monomer fluids to produce a liquid film condensate, which is then radiation cross-linked to form a solid film. A LML process involves the vacuum coating of the monomer liquid directly onto the substrate by means such as extrusion, gravure rollers, spraying, etc., and subsequently radiation cross linking monomers in the thin liquid coating. LML processes may require coatings in excess of 10 micrometers, and accordingly, PML may be preferred for the formation of an acrylate coating.

Isolation of the vacuum deposition chambers of each of the coating units 410, 418, etc., from each other, from web formation, and from the payoff devices, may be achieved by any suitable isolation device, such as gas gates, etc.

The materials for and thickness of the two dielectric coatings should be chosen carefully to fulfill several functions in the finished optical disk. These dielectric coatings may protect the phase change coating from exposure to oxygen or water vapor, which could oxidize the phase change material and alter its properties. The dielectric coatings may also be used to provide good contrast and to aid the laser beam that is used to "write" on the disk to be absorbed primarily in the phase change coating. The dielectric layers may also affect the thermal characteristics of the optical disk. The second dielectric coating between the phase change coating and the aluminum coating is selected to be thermally conductive enough to prevent overheating the laser targeted areas of the phase change coating, but not so thermally conductive as to provide excessive heat loss to the aluminum coating. Finally, the dielectric coatings provide rigid supports for the phase change material sandwiched between them when it is heated by a laser.

It is appreciated that the above-referenced microwave PECVD processes for the application of the dielectric coatings may cause build up of dielectric material on the lens that isolates the microwave source from the PECVD chamber. In order to facilitate continuous web processing, an innovative method that effectively replaces the lens on a continuous basis has been developed.

Figure 6:
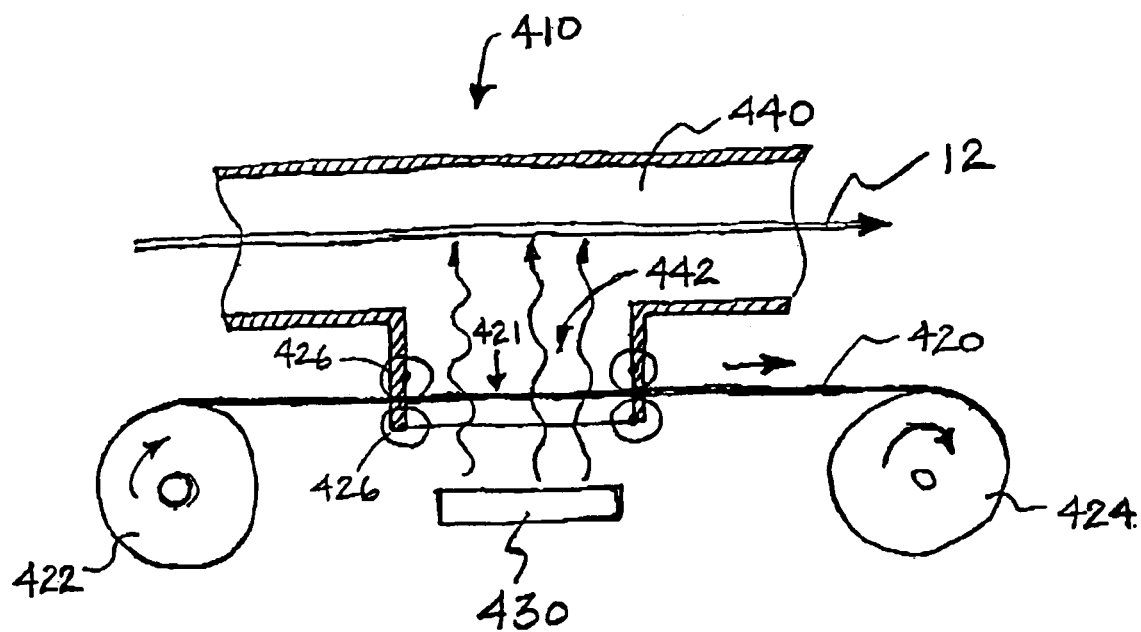
FIG. 6 is a side view of a system for coating optical memory substrate in accordance with the present invention.

With reference to FIG. 6, a web 12 of material used to produce optical disks is coated with material in a deposition chamber 440 of a coating unit 410. The deposition chamber 440 includes an aperture 442. A reel-to-reel web of polyester 420, or other flexible, microwave transparent material, may be used to shield the lens between the microwave source 430 and the deposition chamber 440. The microwave transparent web may be continuously or intermittently drawn from a first reel 422, past the aperture 442, and onto a second reel 424. Opposing rollers 426, or other means, may be provided to create a seal at the intersection of the aperture 442 and the polyester web 420. The polyester web 420 may be repeatedly wound back and forth past the aperture 442 during PECVD operation until the build up of material (such as dielectric coating material) on the surface 421 mandates its replacement. Use of the polyester web 420 to provide the microwave "window" into the deposition chamber 440 may greatly increase the life of the window.

The foregoing discussion of the coatings that may be used to produce a phase change optical memory storage device is intended to be exemplary only. It is appreciated that the coating system may be used to apply any number of different coatings, in different orders, and different thicknesses, in order to produce a wide variety of optical memory storage devices, such as those discussed in the background section of this application. Accordingly, the detailed discussion of phase change memory devices should not limit the scope of the present application.

Again with reference to FIG. 5, after coating, the web 12 exits the coating applicator 400 and enters a web cutting or sectioning device 500. The web cutting device 500 may be any device suitable for separating web into sections or strips 510 that are some multiple of disks, such as one or more in length or width. The web cutting device may include a rotary cutter for sectioning the web. The web cutting device may also include a system for removing dust or debris produced by the cutter, such as ionized air and vacuum.

After the strips 510 are formed they may be collected or accumulated into bins or removable cassettes 610 with an accumulating device 600. By collecting disks into an accumulator, line speed can be increased and by collecting sections of web in removable cassettes, sections of web can be finished either offline or on multiple lines. Disk finishing may also be done directly from the web or from a continuous roll of embossed and coated material.

Disk finishing requires precise formation of the outer (outer diameter, o.d.) and center portions (inner diameter, i.d.) of the replicated substrate and disk microstructure. Disk finishing may include any of a wide variety of operations, such as punching, cutting, milling, or other means of forming the i.d. and o.d. of disks.

Figure 7:
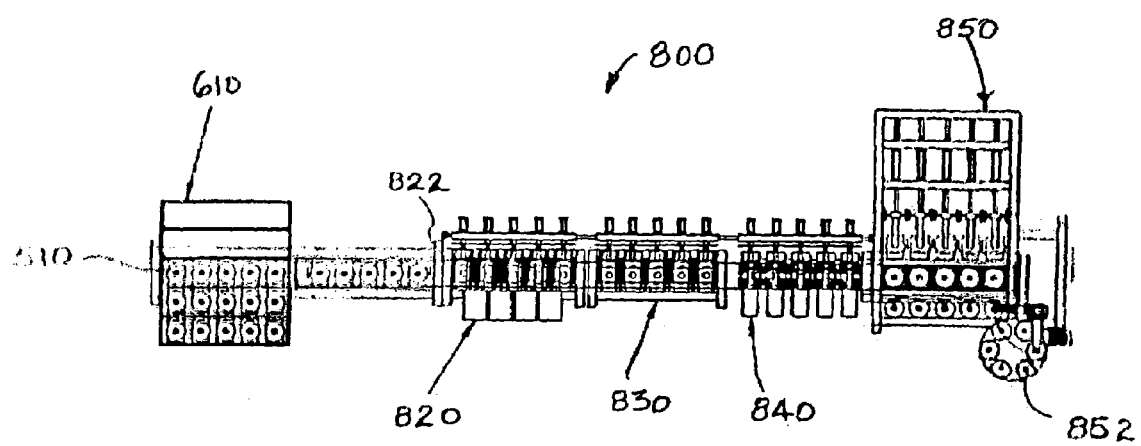
FIG. 7 is a side view of a system for finishing optical memory in accordance with the present invention.

With reference to FIG. 7, shown therein is a disk finishing system 800 in accordance with a preferred embodiment of present invention. The disk finishing system may be adapted for accepting strips 510 from the accumulator 610. At the initiation of the disk finishing system, strips 510 of web can be unloaded from cassettes onto a conveyor. The strips may be conveyed to a rough cut or squaring station 820. At the squaring station, the strips 510 can be cut into smaller shapes, such as squares 822 that contain only a single disk microstructure. After the strips 510 are cut into squares 822, the squares may then be conveyed to a separator ring embossing station 830, where an elevated ridge of substrate material (i.e., a disk separator ring) may be formed. The separator ring allows stacked disks to be easily separated when stacked together and prevents scuffing damage to the microstructure. After formation of the separator ring on the disk substrates, each may be sent to center hole punching or blanking station 840 and then to a scrap (material outside of the disk) removal station 850. After the center hole and the scrap around the disk are removed, the individual, semi-finished disks may be stacked at a stacking station 852.

Figure 8:
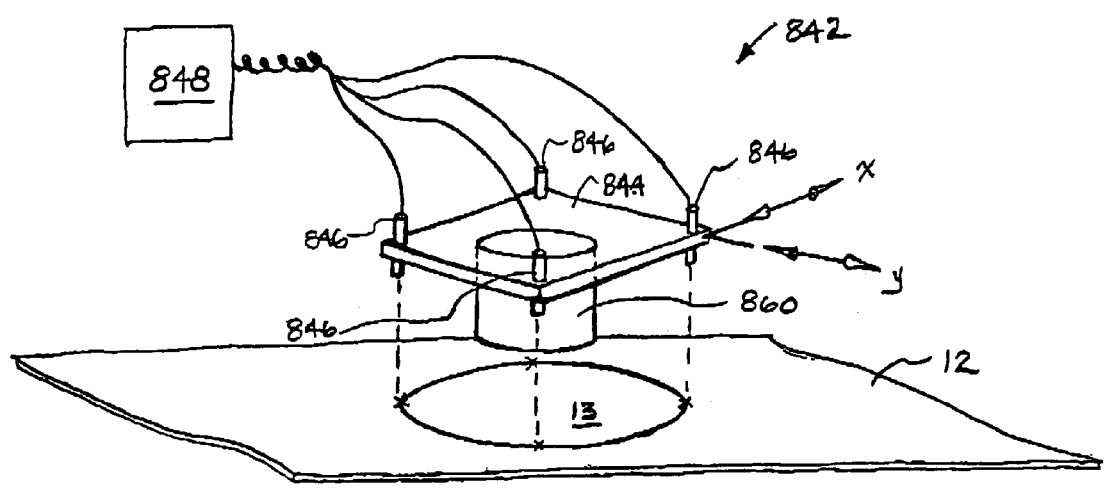
FIG. 8 is a perspective view of a system for finishing optical memory production in accordance with the present invention.

With reference to FIG. 8, depicted therein is a preferred web sectioning station which may include a device 842 for centering the microstructure pattern of a disk substrate. The device 842 may include a table or platform 844 that is disposed above the web 12 on which the disk substrate microstructure pattern 13 has been formed. The table 844 may be selectively translatable in the x and y directions by a motorized assembly (not shown). Optical sensors 846 may be supported by the table and directed orthogonally toward the web 12. The optical sensors 846 may provide detection signals to a control unit 848. The detection signals received by the control unit 848 may be used to control centering and translation of the table 844. The table 844 is translated so that each of the optical sensors 846 is located directly above the edge of the microstructure pattern 13 on the disk substrate. Once the table 844 is centered above the microstructure pattern, a punch unit 860 carried in the center of the table 844 may be used to form the center hole (i.d.) and/or (o.d.) of the memory device.

Figure 9:
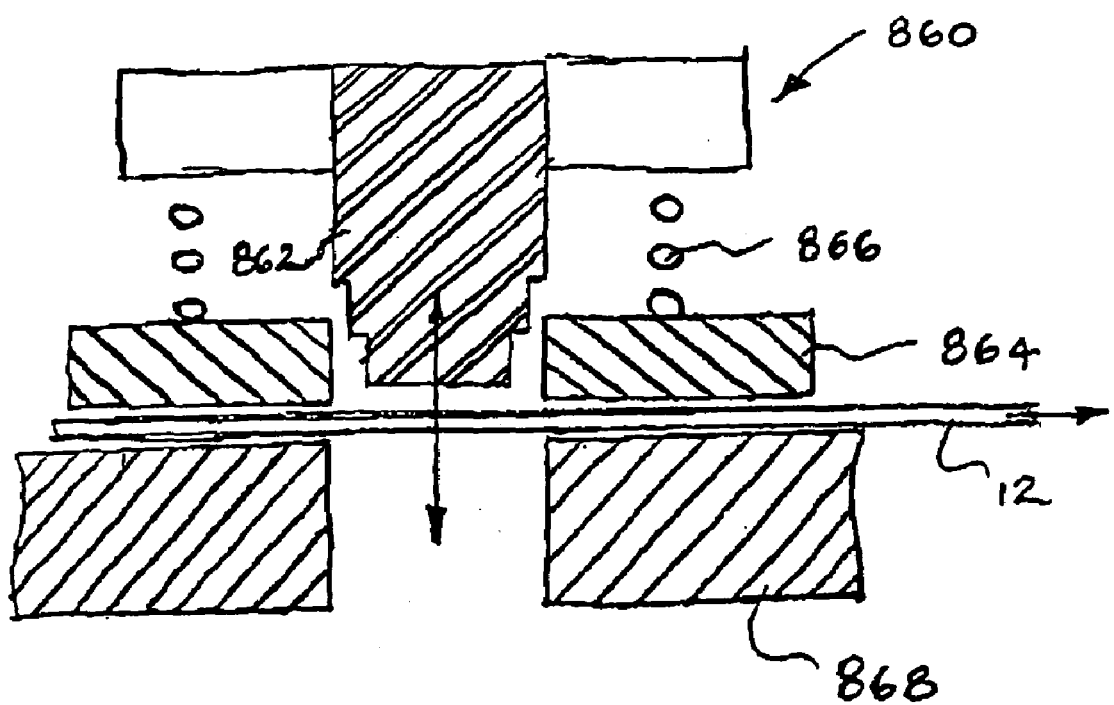
FIG. 9 is a side view of a system for holing web material in accordance with the present invention.

A preferred embodiment of a punch unit is shown in FIG. 9 at 860. The punch unit 860 may include a staged center die 862, a silicone pad 864, a spring 866, and a die button 868. The die may be constructed of any suitable material. The die may include one or more stages. Preferably, each stage has a depth suitable for cleanly piercing polymeric substrate. The spring 866 may be disposed to bias the pad downward to clamp the web 12 between the pad 864 and the die button 868. The staged center die 862 may then be pressed down through the web 12 to form a center hole therein. The stages formed in the center die 862 can reduce the likelihood of forming a center hole with a jagged or irregular edge.

Figure 10:
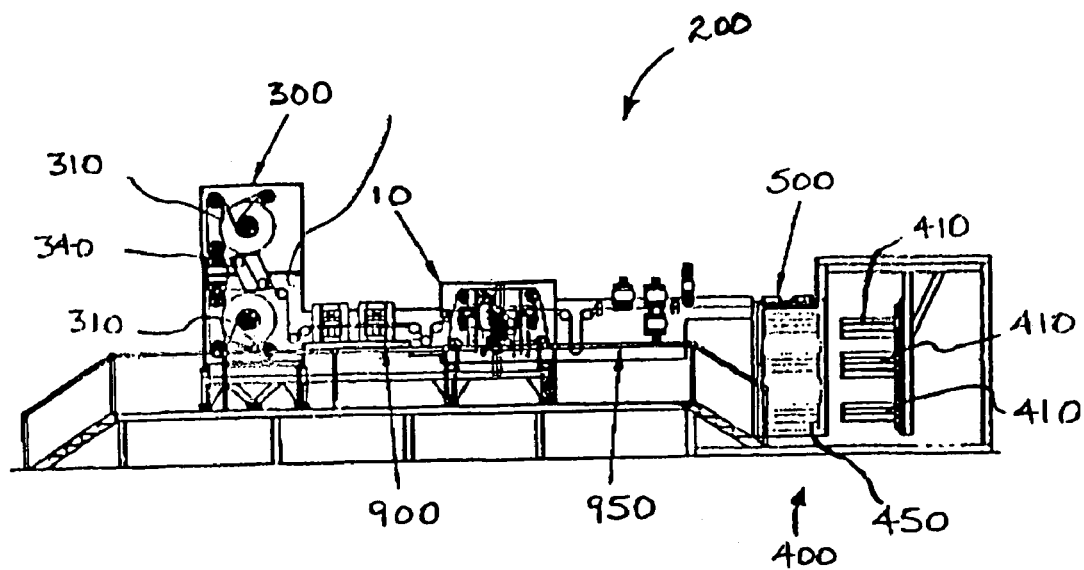
FIG. 10 is a side view of a system for optical memory production in accordance with the present invention.

Referring now to FIG. 10 is an alternative embodiment of a system for forming optical memory 200, in which like reference numerals refer to like elements shown in the other drawing figures. As shown in FIG. 10, the web pay-off device 300 may include a splicing unit 340 for providing continuous web pay off from multiple rolls 310 of web material.

The system, as exemplified by FIG. 10 may be particularly useful for the production of optical substrates for DVDs. As noted previously, DVDs are produced by joining two disks together. The surface of the information carrying disk that is bonded to the opposing disk is the same surface that may have one or more coatings applied to it. The coatings, however, are not conducive to the formation of a mechanically robust, hermetically sealed bond between the information carrying disk and the opposing disk. Accordingly, there is a need to leave portions of the information carrying disk, namely the outer edge of the perimeter and the inner perimeter, uncoated. As such, a system for masking portions of the substrates before coating may be used to form disk substrates with uncoated outer and inner regions which are useful in bonded memory devices.

In accordance with a preferred embodiment of the system for masking portions of the substrates before coating, there may be provided an indexing system so that edges of memory devices can be accurately formed. Substrate indexing may be provided by one or more pre-punch and post punch stations, items 900 and 950 of FIG. 10, respectively. Indexing allows accurate disk removal, accumulating and coating of web material.

Figure 11:
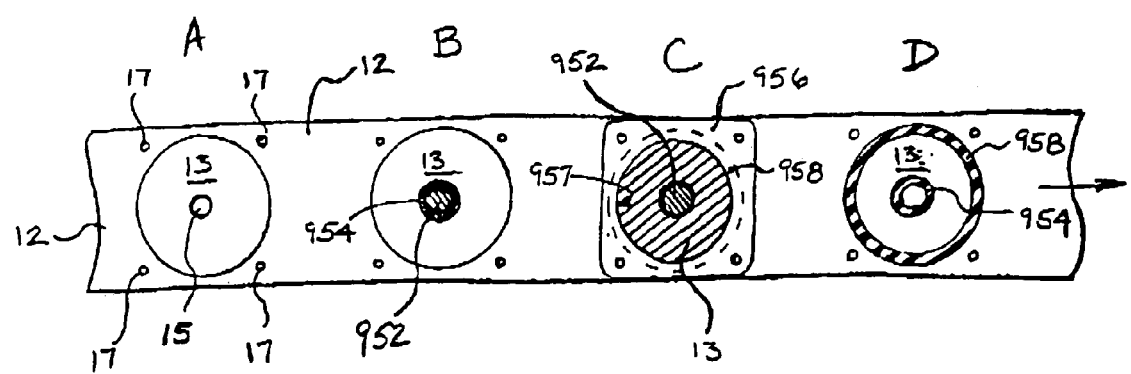
FIG. 11 is a top, plan view of a system for finishing optical memory by masking in accordance with the present invention.

For example, FIG. 11, shows a disk substrate 13 at various stages of formation, A, B, C, and D, representing the evolution of the disk substrate as it passes through various processing stations. At stage A, the pre-punch station 900 (FIG. 10) may put a center hole 15 and one or more registration holes 17 in the web. The center hole 15 may be formed by any means, such as a punch unit as shown in FIG. 9, by melting, drilling, cutting, etc. The center hole 15 may have a diameter that is the same as or less than the final center hole in a finished optical disk. If the diameter of the center hole 15 is less than that required for a finished optical disk, it may be enlarged at a later processing stage. Like the center hole 15, the registration holes 17 may be formed by any means, such as a sprocket punch. The registration holes may or may not extend entirely through the web 12. Preferably, the center hole 15 is precisely equidistant from each of the registration holes 17 so that the relationship of the registration holes to the center hole is known.

With continued reference to stage A, after the center hole 15 and the registration holes 17 are formed in the web 12, the web passes to the web forming apparatus 10. The forming apparatus 10 may be equipped with means for engaging the registration holes 17, such as pegs or keys. By engaging the registration holes, the forming apparatus 10 can register the stamper with the web 12 so that the microstructure pattern is positioned precisely around the center hole 15.

With reference to stage B of FIG. 11, after the microstructure pattern is formed on the web 12, the disk substrate 13 is sent to the post-punch station 950 (FIG. 10). At the post-punch station 950 a central plug 952 may be inserted into the center hole 15. The central plug 952 may be constructed of any suitable material. The central plug 952 may be fastened to the disk substrate 13 in any suitable way. The central plug 952 is larger than the center hole 15 so that it masks an inner perimeter region 954 of the disk substrate 19. The masked inner perimeter region 954 is preferably fixed to have a width of approximately that of conventional media.

With reference to stage C of FIG. 11, an outer mask 956 may be applied over the disk substrate 13 while it is at the post-punch station 950. The outer mask 956 may be registered to the web 12 by engaging the registration holes 17 of the web. The outer mask 956 may be constructed of any suitable material. The outer mask 956 may be fastened to the disk substrate 13 in any suitable way. The diameter of the interior opening 957 in the outer mask 956 is less than the final diameter of the disk substrate 13, so that it masks an outer perimeter region 958 of the disk substrate. The masked outer perimeter region 958 may preferably have a width of approximately ½ to 3 mm, and more preferably of approximately 1 mm.

After the plug 952 and the outer mask 956 are in place, the disk substrate 13 may be conveyed from the post-punch station 950 to the web cutting device 500 where the web 12 can be cut into strips 510 of a suitable length and/or width. The strips 510 may be accumulated for further processing by batch or may be immediately transferred to a coating applicator 400. At the coating applicator 400, the strips may be placed into tracks disposed along the inside cylindrical surface of a rotating drum portion 450. The strips 510 may be loaded into the drum 450 so that the masked surfaces of the disk substrates 13 are exposed to the drum interior or coating stream. The drum may be sealed, by any suitable device during coating.

Figure 12:
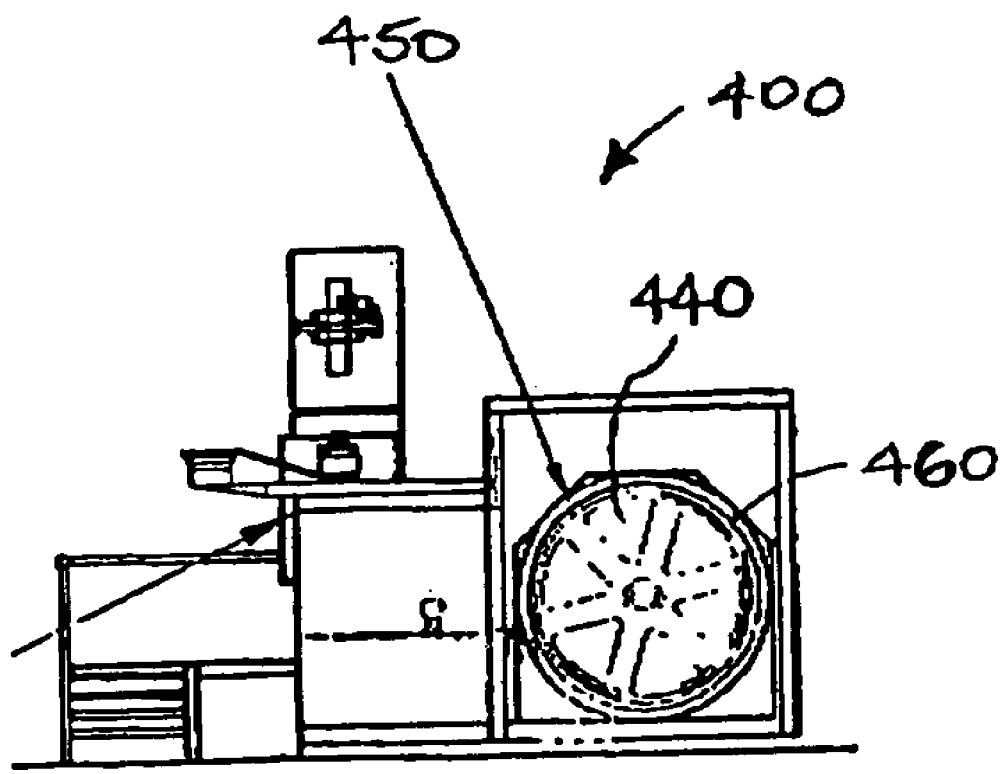
FIG. 12 is a side view of a system for coating web material in accordance with the present invention.

The drum 450 of the coating applicator 400 may be arranged to rotate orthogonally to the direction of the web 12 pay off. Arranging the drum orthogonally to the direction of the web pay-off allows web strips 510 to be linearly advanced directly into the drum 450. The side of the drum 450 opposite the web cutting device 500 may be open to allow one or more coating units 410 to be inserted therein. The coating units 410 may be mounted on an internal wall capable of being sealed in the drum 450. Once the wall on which the coating units 410 are mounted is closed, the drum can be rotated about its axis so that the web strips 510 disposed along the inner wall of the drum are transported through various coating zones defined by the coating units 410. A side view of the drum 450 and the deposition chamber 440 defined thereby is shown in FIG. 12. In order to carry out the coating process with a drum-shaped coating apparatus 400, it may be necessary to cool the drum 450 or the substrate in the drum. One method of cooling the drum 450 is to include a water jacket 460 around the outside of the drum. The use of a water jacket allows control over the temperature of the drum and over web strips disposed inside of the drum.

With continued reference to FIG. 11, after the disk substrate 13 is coated, the plug 952 and the outer mask 956 may be removed. The disk substrate 13 then appears as shown in stage D, including coatings on the surface with the exception of the outer perimeter region 958 and the inner perimeter region 954. The strips web that reach stage D may then be sent to a finishing line, such as one discussed above in connection with FIG. 7. The finishing station for disk substrates that reach stage D, however, may require an additional station to bond the information carrying substrate to an opposing substrate (such as a blank or embossed material).

An alternative embodiment of the drum-shaped coating apparatus 400 is to have the coating apparatus 400 rotate in line with the web pay off direction. As a result, the disk substrates, in strip or web form, may be loaded directly onto the drum 450 as it rotates.

The embodiments of the invention(s) disclosed heretofore may be used with or without melt forming. While melt forming contemplates forming microstructures into the surface of the web during a very brief period of time (on the order of tens of milliseconds, preferably less), several of the embodiments of the preceding may be useful with other replication processes. While the invention has been illustrated in detail in the drawings and the foregoing description, the same is to be considered as illustrative and not restrictive in character as the present invention and the concepts herein may be applied to any formable material. It will be apparent to those skilled in the art that variations and modifications of the present invention can be made without departing from the scope or spirit of the invention. For example, the dimensions of the optical substrates, and the microstructures formed therein can be varied without departing from the scope and spirit of the invention. The materials used to construct the various elements used in the embodiments of the invention, such as the pressure and backing rollers, the stamper, the stamper support, and the heater, may be varied without departing from the intended scope of the invention. Furthermore, it is appreciated that the support for the stamper and the backing roller could be integrated so as to provide one structure. The stamper may then be separated from the backing roller with an insulator. Still further, it is appreciated that the present invention extends to embodiments that use optical memory substrates in any form, be that web, sheet, or otherwise. Further more, by using one or more of the embodiments described above in combination or separately, it is possible to make optical memory disks with less than ±0.8 degrees radial deviation, and less than ±0.3 degrees tangential deviation, with a birefringence of less than 100 nm double pass, more preferably less than 90 nm double pass, and still more preferably less than 60 nm retardation, double pass, through 1.2 mm, or less, of web material. Thus, it is intended that the present invention cover all such modifications and variations of the invention, that come within the scope of the appended claims and their equivalents.

What is claimed is:

1. An apparatus for forming microstructures on the surface of polymeric material for use in optical memory comprising:
   a web feed apparatus; and
   a device for web forming, the device for web forming having at least one stamper and a set of rollers which form a nip zone in communication with said web feed apparatus, said at least one stamper being carried by a support that is detached from the rollers and comprises at least two separate hoops which are axially spacedly disposed from one another and coaxially aligned, and said at least one stamper is affixed at separate edges thereof to each of said at least two hoops.

2. The apparatus of claim 1, wherein one of the rollers is a backing roller for pressing said at least one stamper into the web, and the ratio of the diameter of each hoop to the diameter of said backing roller is at least 5:4.

3. The apparatus of claim 1, wherein one of the rollers is a backing roller for pressing said at least one stamper into the web, and the ratio of the diameter of each hoop to the diameter of said backing roller is at least 13:8.

* * * * *